United States Patent [19]
Rose et al.

[11] Patent Number: 4,629,363
[45] Date of Patent: Dec. 16, 1986

[54] CONTINUOUS CONDUIT LAYING APPARATUS

[76] Inventors: Timothy M. Rose, 891 Mariposa Dr.; J. Ken Rose, 430 Geo. Wash. Blvd., both of Yuba City, Calif. 95991

[21] Appl. No.: 667,780

[22] Filed: Nov. 2, 1984

[51] Int. Cl.$^4$ .................... E02D 29/10; E02F 5/10; F16L 1/00
[52] U.S. Cl. .................... 405/155; 405/157; 405/178; 405/180; 425/59
[58] Field of Search ............... 405/154–157, 405/174, 176–179, 180–183, 184; 249/11; 425/59; 138/105, 108, 111, 113; 174/37, 38

[56] References Cited

U.S. PATENT DOCUMENTS

| | | | |
|---|---|---|---|
| 330,724 | 11/1985 | Montgomery | 405/155 |
| 992,649 | 5/1911 | Gale | 405/155 X |
| 1,006,116 | 10/1911 | Morse | 405/155 |
| 1,398,815 | 11/1921 | Trusky et al. | 405/155 |
| 3,348,383 | 10/1967 | Kelley | 405/181 |
| 3,354,660 | 11/1967 | Vaughan | 405/174 |
| 3,604,215 | 9/1971 | Dunn | 405/155 |
| 3,713,760 | 1/1973 | Hemphill | 405/115 X |
| 3,777,500 | 12/1973 | Kelley | 405/180 |
| 3,859,809 | 1/1975 | Clayhold et al. | 405/179 |
| 4,437,789 | 3/1984 | Kasiewicz | 405/155 X |

FOREIGN PATENT DOCUMENTS

| | | | |
|---|---|---|---|
| 130896 | 7/1947 | Australia | 405/157 |
| 760419 | 12/1933 | France | 405/155 |
| 570970 | 7/1945 | United Kingdom | 405/177 |
| 1263464 | 2/1972 | United Kingdom | 405/155 |

*Primary Examiner*—Cornelius J. Husar
*Assistant Examiner*—Nancy J. Stodola
*Attorney, Agent, or Firm*—Richard D. Slehofer

[57] ABSTRACT

A continuous concrete encased conduit laying apparatus is attached to the rear of a tractor in a cantilevered fashion and can be raised and lowered into the ground by the tractor. The apparatus has two sections which are pivotally attached to each other. The forward section is the gouger, and it has a vertical bar having a sharp leading ripper edge. At the base of the bar are attached a wedge and a cone-shaped expander for creating a cavity in the ground as the apparatus is being pulled through the ground.

The rear section which is the conduit layer, has a vertical guide tube, a concrete chute attached behind it, and a second expander forming the base of the layer. There is a hopper for holding the fresh concrete at the top of the chute. A quantity of conduit is fed through the guide tube as the apparatus is in operation. The cavity created by the two expanders is filled with fresh concrete as the conduit is laid in the cavity. The second expander can be round or rectangular in cross-section for holding several conduits, and for creating various cross-section encasements. The method includes the steps of laying the conduit and encasing it with concrete in the cavity.

5 Claims, 8 Drawing Figures

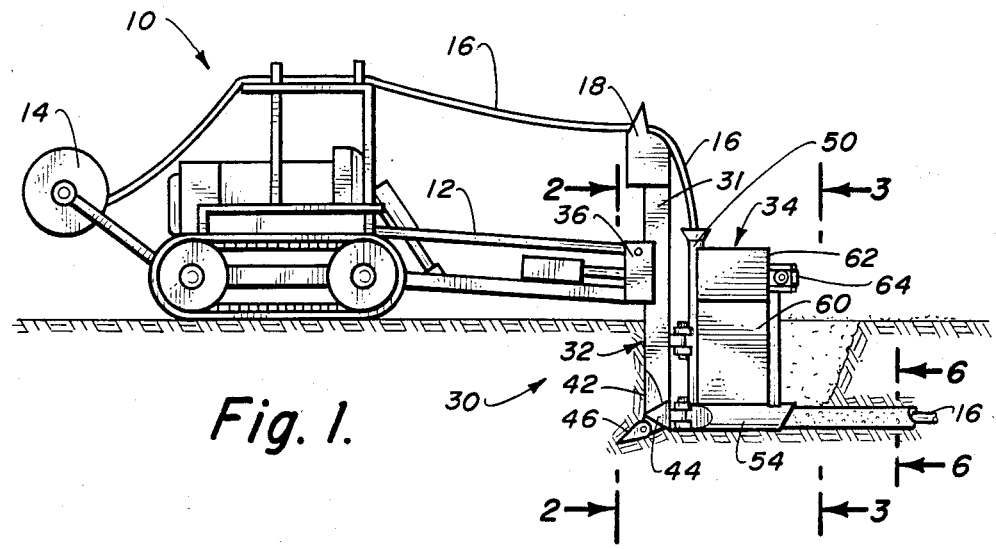
Fig. 1.
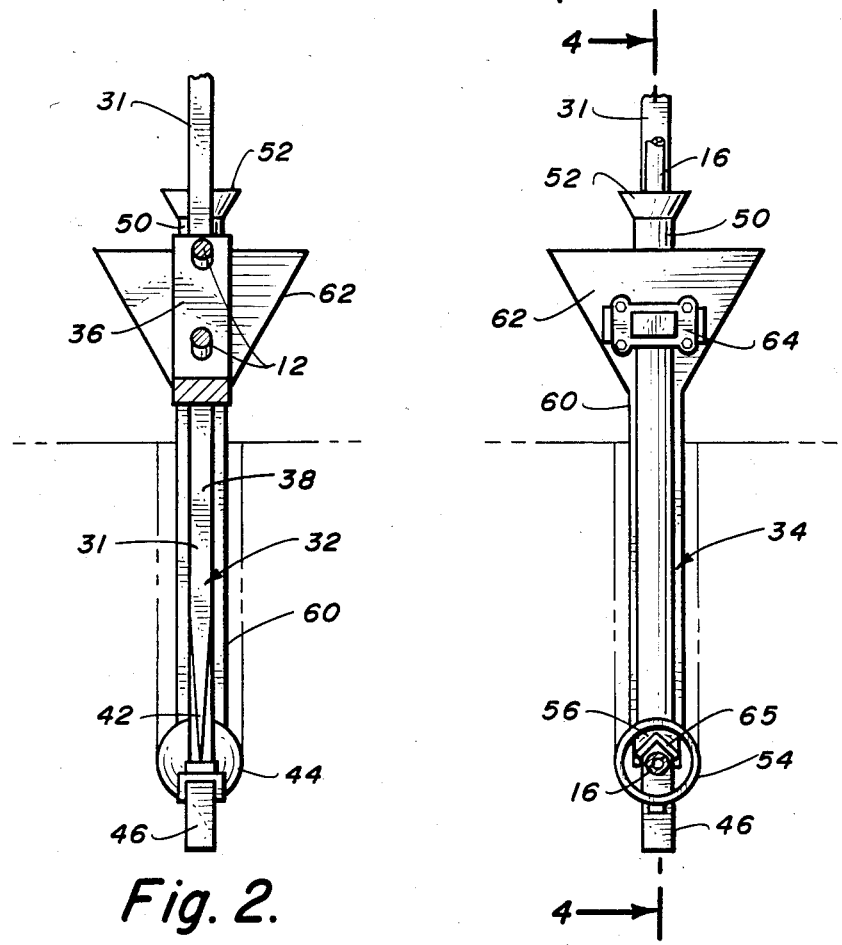
Fig. 2.
Fig. 3.

CONTINUOUS CONDUIT LAYING APPARATUS

SUMMARY OF THE INVENTION

This invention encompasses apparatus and the method for laying a buried communication system. More specifically, for laying a continuous fibre optic cable below ground level. The purpose of the below the ground cable installation is to reduce maintenance costs and the cost of installation of telecommunication trunk lines et al. The continuous hollow pieces of flexible plastic conduit are buried in the ground and surrounded by fresh concrete which sets into a rectangular or round cross-section and encasing the continuous plastic conduit. After a given segment of the conduit is laid, for example, for a two mile period, the fibre optic cables are drawn through the hollow conduits. Depending on terrain, about every 2 mile segment has a station for connecting the fibre optics.

The apparatus used in making the encased conduit below the ground level consists of a caterpillar type tractor pulling a gouging and conduit laying apparatus behind it. The tractor has the gouging and conduit laying apparatus attached in a cantilevered fashion to its rear so that the apparatus can be raised and lowered into the ground by the tractor. The conduit laying apparatus consists of two sections; the forward section is the gouger, and the trailing section pivotally attached to the gouger is the conduit laying means itself. The gouger section consists of an elongate vertical bar having its leading narrow edge as the cutting edge of the gouger. About half of the bar always remains above the ground, but the lower half has a knife-like leading edge which is the ripper which initially cuts the ground. Attached below the ripper on the bar is a wedge-shaped metal piece which is pivotally attached at the base for acting as the first point to separate the ground soil. Just behind the wedge is a conical-shaped expander welded to the base of the bar for pushing away the soil and creating a cavity.

The conduit layer has a second expander forming the base of the conduit layer and this is attached directly behind and pivotally to the first cone-shaped expander on the gouger section. Attached above this second expander in an upright manner is a guide tube which guides the conduit from a reel attached to the tractor. Just behind the guide tube is attached an elongate rectangular section which is the concrete chute. The concrete chute opens into the second expander for allowing a passageway for the fresh concrete to flow. The top of the concrete chute has a hopper welded to it for holding a given quantity of fresh concrete and a shaker for continuously vibrating and shaking the fresh concrete.

The second expander means is generally a cylindrical section having a beveled cut at this rearward edge. The front of the second expander is sealed by a wedge cutting face. As the entire apparatus is pulled through the ground, the cone-shaped first expander expands the soil initially and the second expander which is positioned in tandem behind the first expander tends to firm up the cavity wall created by these two expanders. This creates a continuous hollow cavity at the beveled end of the second expander. This hollow cavity provides a space for the conduit to be positioned into. It also allows the fresh concrete to pass through the concrete chute and the second expander to form a round semisolid mass filling up and forming the encasement. The hollow conduit is concentrically positioned in this round semisolid concrete. After several hours the concerete will set and after several days the concrete will be fairly solid, so that there is a permanent protection by means of the encasement comprised of the hard concrete holding the plastic hollow conduits.

This second expander can be modified to be rectangular shaped to encase several conduits. Depending upon the requirements of the particular job, a plurality of hollow conduits can all be encased in one process.

There is a piece of metal welded in the second expander means which acts as a disperser as the fresh concrete falls through the concrete chute. This disperser spreads the fresh concrete around the conduit in a uniform manner. The hopper can hold enough concrete so that the apparatus can lay a stretch of concrete encased conduit before the hopper needs refilling. The cement truck traversing parallel to the tractor can feed concrete into the hopper at periodic intervals.

Accordingly, it is an object of this invention to provide a continuous concrete encased conduit layer which lays a stretch of hollow flexible conduit in a tunnel or cavity spaced three feet below the ground and encased in a protective concrete encasement. This provides a passageway for threading through a fibre optic for the stretch of laid conduit.

It is another object of this invention to provide a conduit layer apparatus having a front gouger section and a rear conduit laying section which is pivotally attached to the gouger section for providing more manueverability as the conduit is laid and encased with cement.

It is another object of this invention to provide a plurality of concentrically located hollow conduits and concrete encased for providing a passageway for a plurality of cables.

It is yet another object of this invention to provide rectangular cross-sectional shaped concrete encasement hollow continuous conduits for providing a plurality of conduits which are generally positioned toward the center of the cross-section of the rectangular-shape.

It is yet another object of this invention to disclose a method of laying a continuous flexible conduit protected by a concrete encasement in a ditch underneath the ground to protect the cables within the conduits from environmental damage.

BRIEF DESCRIPTION OF THE DRAWINGS

FIG. 1 is a side-elevational view of the tractor and conduit layer in operation.

FIG. 2 is a front-elevational view of the gouging means taken along the line 2—2 of FIG. 1.

FIG. 3 is a rear-elevational view of the conduit laying means taken along the line 3—3 of FIG. 1.

DETAILED DESCRIPTION OF THE PREFERRED EMBODIMENT

Figure 4:
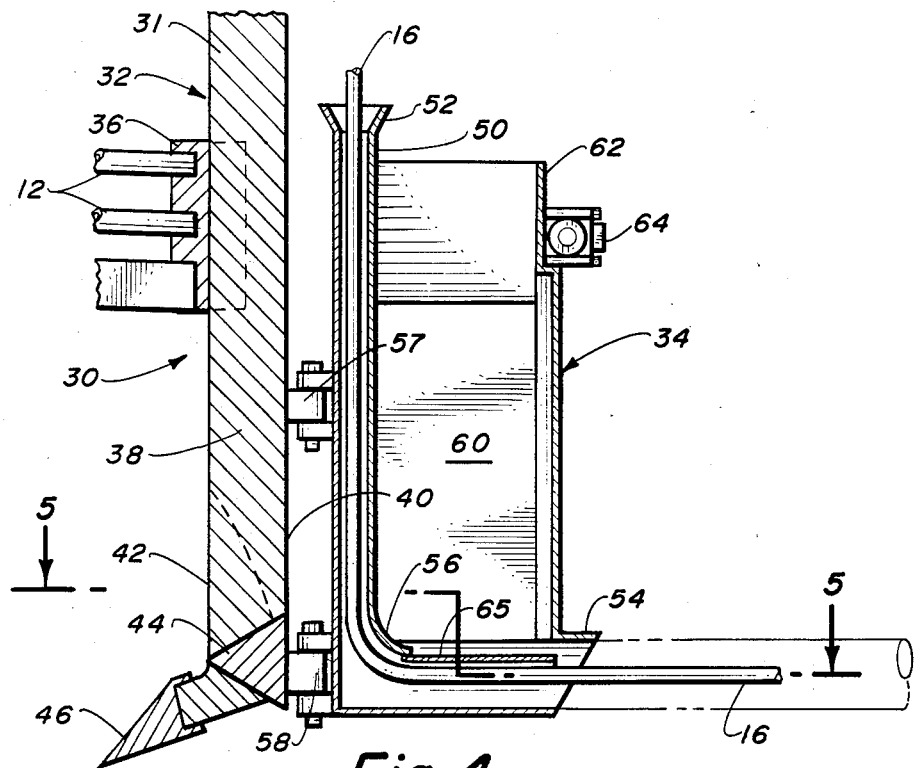
FIG. 4 is a cross-sectional view of the gouging and conduit laying means taken along line 4—4 of FIG. 3.

FIG. 1 illustrates a schematic diagram of the tractor and the conduit laying apparatus in operation positioned in the ground. FIG. 1 has the cross-sectional view of the ground removed to illustrate how the apparatus is in position and functioning to lay the continuous concrete encased conduit. The tractor is generally referred to as 10. At the rear of the tractor 10 are hydraulically actuated arms 12 for holding the conduit apparatus in a cantilevered psoition. These hydraulic arms 12 can raise and lower the conduit laying apparatus. The tractor contains a reel 14 placed at the front of the tractor for providing a spool of flexible hollow conduit 16 which is threaded above the tractor and through a threader 18 for insertion into the conduit laying apparatus.

As illustrated in FIG. 1, the conduit 16 is fed into the conduit laying apparatus and eventually is shown in the concrete encasement with a part of the conduit 16 exposed for clarification and understanding of this schematic illustration.

The conduit laying means is generally shown as 34. The apparatus 30 is subdivided into a forward gouging means 32 and pivotally attached rearward section generally described as the conduit laying means 34. The apparatus 30 is illustrated more clearly in FIG. 4, which is a cross-sectional elevational view of the two sections 32 and 34. The gouging means 32 is attached to the tractor lever arms 12 by a means for securing the gouging means to the tractor illustrated as a bolt-on type of clamp 36.

The gouging means is illustrated in FIG. 4 and in FIG. 1 and described as an elongate, vertical, rigid bar 31 having a leading edge 38 and a trailing edge 40. The leading edge 38 of the bar has a ripper means 42 which is illustrated as a cutting edge being positioned below the ground when the apparatus is in the digging mode. This ripper 42 assists in gouging the ground. Attached to the base of the bar 31 is a first expander means 44 illustrated as a solid cone having the apex of the cone just at the base of the ripper 42. This first expander 44 helps to form a cavity in the ground as the apparatus is moved through the ground. Attached just ahead of the first expander 44 is a wedge means 46 which is illustrated as a wedge-shaped solid piece of metal pivotally attached to the leading edge and at the base of the rigid bar 31. This wedge 46 also assists in gouging the ground as the apparatus is moved through the ground. The wedge 46 initially cuts and pushes aside the dirt, the ripper 42 helps cut a path, and the first expander 44 tends to push away the dirt, thereby forming a continuous horizontal tunnel or cavity in the ground as the apparatus is moved through the ground by the tractor 10.

The rear section 34 of the conduit laying apparatus consists of a conduit laying means illustrated in FIG. 4 as having the following features: There is a vertical guide tube means 50 illustrated as a cylindrical tube having a funnel 52 at its top and merging at the bottom with the second expander means 54. The vertical guide tube 50 guides the conduit 16 from the reel carrier 14, and as it enters the second expander means 54, the conduit is bent at a generally right angle for being threaded into the cavity created by the apparatus in operation.

The guide tube 50 is pivotally attached to the trailing edge 40 of the rigid bar 31 by means of a first hinge 56 and a lower second hinge 58. Although two hinges are disclosed in this embodiment, it is foreseeable that the two hinges can be combined to have one extended hinge. There is an elongate concrete chute means 60 rigidly attached to the guide tube 50. This chute means is illustrated as an elongate rectangular shape having an open top and connected at the base to the second expander 54. This chute 60 transfers concrete down into the second expander means 54. There is a hopper means 62 attached to the upper rim of the chute 60. This hopper means is illustrated as a box having slanted sides for holding a quantity of fresh concrete which is transferred from the stand-by cement truck. The hopper 62 is to provide some versatility in the laying operation in the sense that it can hold a quantity of concrete between fill-ups of the hopper 62. Securely attached to the hopper, is a shaker means 64 illustrated as a gas or electrical powered motor attached by a brace to the hopper. When the motor is running the vibrations created by the reciprocation of the piston creates sufficient vibration transferable to the hopper 62 which acts as a settling factor in the fresh concrete contained within the hopper and coming down to chute 60.

Figure 5:
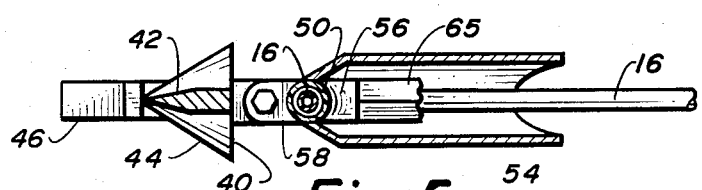
FIG. 5 is a staggered cross-sectional view of the conduit laying means taken along the line 5—5 of FIG. 4.
Figure 6:
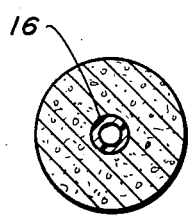
FIG. 6 is a cross-sectional view taken along the line 6—6 in FIG. 1 of a concrete encased conduit showing 1 encased conduit.
Figure 7:
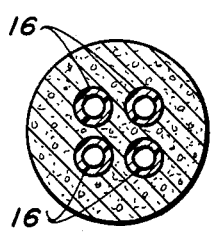
FIG. 7 is a cross-sectional view of a concrete encased conduit disclosing 4 encased conduits.

Disclosed in FIG. 4 and more clearly illustrated in FIG. 5, is the second expander means 54. The second expander means 54 is illustrated as a horizontally placed cylindrical tube having the front face formed as a vertical wedge-shaped face. The rear is open and has a bevelled edge. The upper part of the expander 54 is cut away so that the base of the concrete chute 60 can be welded to it, thereby forming a sealed transfer from the base of the chute 60 into the second expander 54. The base of the guide tube 50 flares somewhat horizontally to provide a shelf 56 to protect the conduit as it rounds the corner into the second expander. Also welded to the base of this shelf 56 is a dispersing means 65 which is illustrated as an inverted v-shaped metal bar rigidly welded into place to act as a roof to protect the conduit 16 as it is being drawn through the second expander 54. This disperser 65 also causes the fresh concrete which is stacked up in the chute 60 to be dispersed on either side into the second expander, thereby filling up the cavity created in the ground in a more uniform manner. As the conduit laying apparatus is pulled through the ground, the cavity or hole created at the rear of the second expander which has a bevel cut allows for the fresh concrete to be uniformly exuded out and around the centrally positioned conduit 16. As illustrated in FIG. 1, the fresh concrete exuded from the bevelled rear opening of the second expander 54 creates a tube-like configuration of concrete which, in cross-section looks like FIG. 6 or FIG. 7. As the fresh concrete settles and hardens, it sets up to create a permanent protective concrete encasement for this flexible conduit 16.

FIG. 3 also shows the disperser 65 positioned just above the conduit also shown in cross-section.

The second expander 54 is positioned in tandem behind the first expander and also axially placed behind the first expander 44. This combination of the two expanders assists in creating a more well-defined cavity in the ground when laying the concrete encased conduit.

If one chooses to lay several conduits, then the reel carrier can hold several loosely tied conduits being threaded as shown in FIG. 1. The end result would be a concrete encased conduit as for example four hollow conduits as disclosed in FIG. 7.

Figure 8:
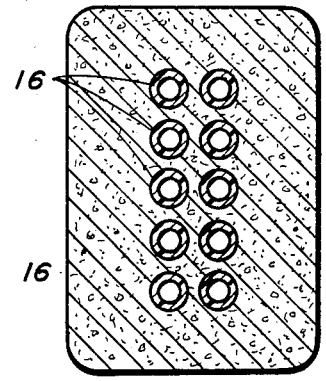
FIG. 8 is a cross-sectional view of a concrete encased conduit showing 10 encased conduits in a rectangular shaped encasement.

Another embodiment could change the cross-section of the second expander 54 from a cylindrical tube to a rectangular tube with the usual vertical wedge-shaped front and a bevel cut rear opening. This embodiment, as disclosed in FIG. 8, illustrates 10 conduits encased.

OPERATION OF THE CONDUIT LAYING APPARATUS

As illustrated in FIG. 1, a typical caterpillar type tractor has the rear forks hydraulically actuated and the entire conduit laying apparatus is bolted onto the fork 12 by means of the upright rigid brace 31. The reel carrier 14 for holding the conduit is placed on the forward section of the tractor and the conduit is threaded through to the threader 18 which is attached to the upper half of the rigid bar. The conduit in turn is threaded down through the guide tube 50 and it is pulled out at the bevelled end of the second expander 54. The end of the conduit is tied down. The apparatus is gradually lowered into the ground as the tractor is moving forward and the cutting wedge 46 and the ripper 42 gouge and dig into the ground until the wedge and the second expander are roughly about 36 inches into the ground. The 3 foot depth provides sufficient protection from the elements to prevent damage to the conduit and cement encasement. A cement truck having fresh cement is pulled up alongside the tractor. The hopper is filled up with fresh cement. The electrical motor, comprising the shaker 64 is then started and the vibration caused by the shaker causes the fresh concrete to work its way by gravity into the second expander. Once the operator is satisified that the conduit laying apparatus section is full of fresh concrete, then the tractor operator begins the forward action. The leading edge and the wedge of the gouging means form the cavity in the ground and the second expander compacts the soil for forming a relatively firm cavity circumference so that the soil will not cave in and the soft fresh concrete exudes out the bevelled end of the second expander and is deposited in the ground cavity. The pulling of the second expander through the soil aids the deposition of the fresh concrete in the cavity. It acts like a vacuum to keep drawing the fresh concrete out of the second expander; the gravitation and pressure created by the fresh concrete in the concrete chute also aids in pressing out and drawing the fresh concrete into the cavity created by the second expander.

The conduit used is a very flexible type and is sold as the interduct brand name. This allows for a nice bending action from the vertical conduit into the horizontal area of the expander. The conduit somewhat centers itself in the fresh concrete because the bend area 56 or shelf centers the conduit within the second expander.

The conduit is usually secured at the start-up so that it will be pulled from the reel as the tractor moves forward.

The type of gravel used in the concrete mix is pea gravel because it tends to work the best in this type of operation.

The tractor can traverse up and down hills to make corners and turns because the pivotal connection of the gouging means allows the conduit laid to follow the set course of the front gouger. In this way, the conduit can be laid over a wide variety of terrain. The conduit can be laid in up to five mile sections before the laying operation has to be interrupted. The maximum length that a fibre optic can be threaded through a hollow conduit is roughly two miles. This is accomplished by creating a vacuum at one end and sucking the fibre conduit out from the other end. The main purpose of this type of encasement is to provide hollow flexible conduits buried underground for protecting the fibre optic cables which will be placed inside these hollow conduits. The fibre optic cables are very thin, but they can transmit messages in a non-linear fashion. Accordingly, the type and method of conduit laying described herein is especially suitable for laying a network of fibre optic cables.

We claim:

1. A continuous concrete encased conduit laying apparatus for laying fiber optic interducts comprising:
    gouging means adapted to be attached to the rear of a tractor and extending downward into the ground for creating a cavity as said gouging means is moved thorugh the ground by the tractor;
    said gouging means further comprising:
    an elongate vertical rigid bar having a leading edge, a trailing edge, and means for securing said bar to the tractor;
    said bar having a cutting edge formed along the leading edge of said bar below the ground;
    conical shaped first expander means secured to said bar below said cutting edge for forming a cavity in the ground as said gouging means is moved through the ground;
    a detachable wedge pivotally attached at the bottom of said rigid bar for assisting in gouging the ground;
    conduit laying means pivotally attached to said gouging means for laying a continuous concrete encased conduit in a cavity created by said gouging means;
    said conduit laying means further comprising:
    vertical guide tube means pivotally attached to the trailing edge of said gouging means for guiding the conduit as it is being laid in the cavity created by said gouging means;
    an open-ended cylindrical member having a bevelled edge at its open end, and a wedge cutting face at its closed end, said cylindrical member forming the base of said conduit laying means for assiting in forming a cavity in the ground as the apparatus is moved through the ground by the tractor;
    elongate chute means rigidly attached to said guide tube means for transferring concrete to said cylindrical member;
    hopper means positioned on the top of said chute means for holding an amount of concrete as it is being fed through said chute means to said cylindrical member;
    an inverted V-shaped bar positioned within said open-ended cylindrical member, said bar being positioned lengthwise and having one end attached to said vertical guide tube means.

2. The apparatus as recited in claim 1 further comprising:
    a reel carrier attached to said tractor for holding and feeding a quantity of conduit to said conduit laying apparatus.

3. The apparatus as recited in claim 1 further comprising:
    shaker means attached to said hopper for vibrating the fresh concrete in said hopper and said chute when the apparatus is being used.

4. The apparatus as recited in claim 1 wherein said open-ended cylindrical member is aligned axially and in tandem with said conical shaped first expander means.

5. The apparatus as recited in claim 1 wherein said open-ended cylindrical member is an open-ended member having a rectangular cross-section for forming a rectangular concrete encased conduit cross-section.

* * * * *

UNITED STATES PATENT AND TRADEMARK OFFICE
CERTIFICATE OF CORRECTION

PATENT NO. : 4,629,363

DATED : December 16, 1986

INVENTOR(S) : Rose et al

It is certified that error appears in the above-identified patent and that said Letters Patent is hereby corrected as shown below:

Column 6, line 14, "thorugh" should read -- through --.

Signed and Sealed this

Seventeenth Day of March, 1987

Attest:

DONALD J. QUIGG

Attesting Officer    Commissioner of Patents and Trademarks